Patented Jan. 6, 1942

2,269,234

UNITED STATES PATENT OFFICE 2,269,234

POLYMETHINE DYE INTERMEDIATES

Robert H. Sprague, Rochester, N. Y., assignor to Eastman Kodak Company, Rochester, N. Y., a corporation of New Jersey No Drawing. Application October 18, 1940, Serial No. 361,765

17 Claims. (Cl. 260—304)

This invention relates to polymethine dye intermediates and to a process for preparing them.

A kind of polymethine dye intermediate of considerable value is that obtained by condensing the condensation product of a β-alkoxyacrolein acetal and a primary aromatic amine, with a cyclammonium quaternary salt containing a reactive methyl group, in the presence of acetic anhydride. The formation of such a dye intermediate can be illustrated as follows:

(1) $C_2H_5O-CH=CH-CH(OC_2H_5)_2 + C_6H_5NH_2 \xrightarrow{HCl}$ $C_6H_5-NH-CH=CH-CH=N-C_6H_5 \cdot HCl$ (2) 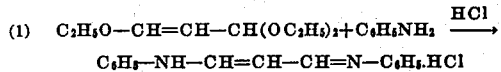

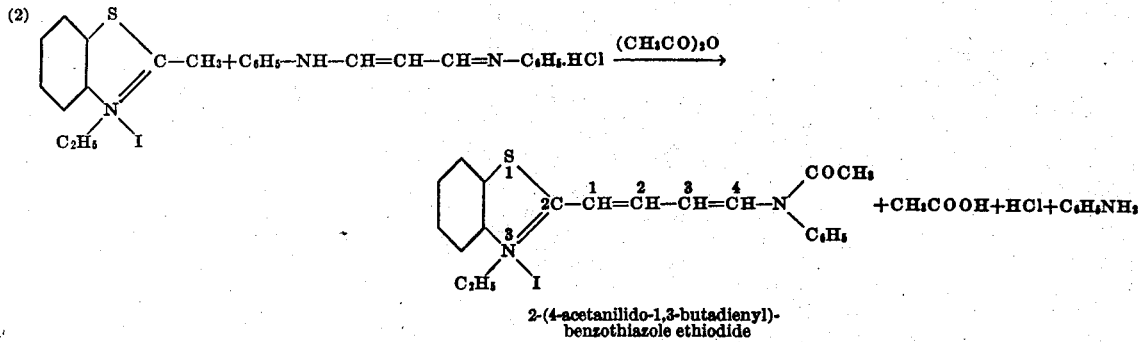

2-(4-acetanilido-1,3-butadienyl)-benzothiazole ethiodide

Dye intermediates, such as 2-(4-acetanilido-1,3-butadienyl)-benzothiazole ethiodide, can be condensed, in the presence of a basic condensing agent, with some cyclammonium quaternary salts containing a reactive methyl group, to give dicarbocyanine dyes, and with some organic compounds containing a ketomethylene group, likewise in the presence of a basic condensing agent, to give merodicarbocyanine dyes.

I have now found that dye intermediates which can be condensed with cyclammonium quaternary salts and with ketomethylene compounds to give dicarbocyanine dyes and merodicarbocyanine dyes, can be prepared by direct condensation of a β-alkoxyacrolein acetal with a cyclammonium quaternary salt containing a methyl group in the alpha position. Thus, I have been able to arrive at useful dye intermediates from β-alkoxyacrolein acetals, without going through the β-anilinoacrolein anil stage. My new intermediates contain an alkoxy 1,3-butadienyl group instead of an acetanilido-1,3-butadienyl group, and can be condensed, I have found, with many substances more readily than can the acetanilido compounds, to give polymethine dyes of several different kinds. My new intermediates are more soluble in most solvents than the acetanilido compounds.

It is, therefore, an object of my invention to provide new dye intermediates and a process for preparing them. A further object is to provide a process for preparing polymethine dyes. Other objects will appear hereinafter.

In accordance with my invention, I condense a β-alkoxyacrolein acetal with a cyclammonium quaternary salt containing a methyl group in the alpha position, employing as a reaction medium, substantially anhydrous acetic acid, such as glacial acetic acid. The process can be illustrated for the benzothiazole series as follows:

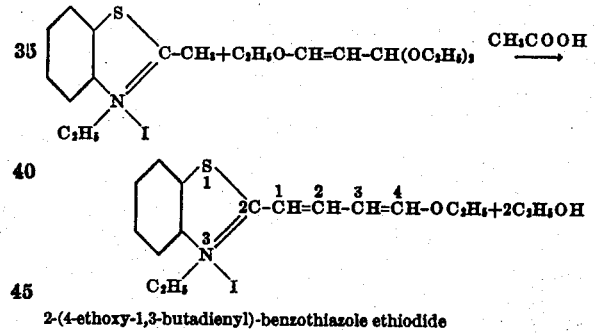

2-(4-ethoxy-1,3-butadienyl)-benzothiazole ethiodide

My process is not to be confused with a proposal, given in the prior art, to prepare dicarbocyanine dyes by condensing β-alkoxyacrolein acetals with cyclammonium quaternary salts containing a reactive methyl group, employing a reaction medium of acetic anhydride. I have found that with acetic anhydride no trace of dye intermediate can be isolated, but only symmetrical dicarbocyanine dye, even in the presence of a large excess of the β-alkoxyacrolein acetal.

In carrying out my new process, an excess of β-alkoxyacrolein acetal is advantageously employed, from one and one-half to three molecular proportions of acrolein acetal for each molecular proportion of cyclammonium quaternary salt being especially suitable. Heat accelerates the formation of my new dye intermediates. β-alkoxyacrolein diethyl acetals, particularly β-ethoxyacrolein diethyl acetal, are advantageously employed.

The following examples will serve to demonstrate the manner of obtaining my new dye intermediates. These examples are not intended to limit my invention.

EXAMPLE 1.—2-(4-ethoxy-1,3-butadienyl)-benzothiazole ethiodide

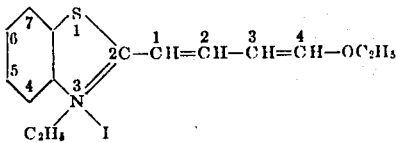

30.5 g. (1 mol.) of 2-methylbenzothiazole ethiodide and 34.8 g. (1 mol.+100% excess) of β-ethoxyacrolein diethyl acetal were mixed together in 100 cc. of glacial acetic acid. The mixture was heated for ten minutes on a steam bath, with stirring. The green reaction mixture was chilled to 0° C., the dye intermediate filtered off, washed with acetone and then with water and finally dried in the air. After recrystallization from absolute ethyl alcohol (30 cc. per gram of intermediate, the dye intermediate was obtained as bright green crystals, melting with decomposition at 177° to 178° C. Yield 18.8 g. (49%).

EXAMPLE 2.—2-(3-ethoxy-1,3-butadienyl)-benzoxazole ethiodide 28.9 g. (1 mol.) of 2-methylbenzoxazole ethiodide and 26.1 g. (1 mol.+50% excess) of β-ethoxyacrolein diethyl acetal were placed in 60 cc. of glacial acetic acid. The mixture was heated for ten minutes on a steam bath, with stirring. The green reaction mixture was chilled with an ice bath, the chilled mixture diluted with 300 cc. of diethyl ether, and the diluted mixture stirred until the intermediate crystallized out. The intermediate was filtered off, washed with diethyl ether and dried in the air. The dark blue crystals thus obtained were deliquescent. Yield 24 g. (65%).

EXAMPLE 3.—2-(4-ethoxy-1,3-butadienyl)-β-naphthothiazole ethiodide

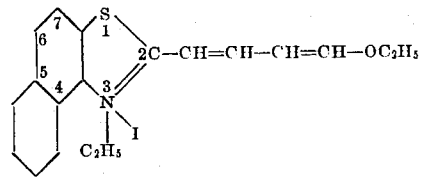

35.5 g. (1 mol.) of 2-methyl-β-naphthothiazole ethiodide and 34.8 g. (1 mol.+100% excess) of β-ethoxyacrolein diethyl acetal were placed in 100 cc. of glacial acetic acid. The mixture was heated for five minutes on a steam bath, with stirring. The brown reaction mixture was chilled to 0° C. and the intermediate filtered off. It was washed with acetone and water, and finally dried in the air. After recrystallization from methyl alcohol (20 cc. per gram of intermediate), the intermediate was obtained as green crystals, melting with decomposition at 174° to 175° C. Yield 20.9 g. (48%).

EXAMPLE 4.—2-(4-ethoxy-1,3-butadienyl)-α-naphthoxazole ethiodide

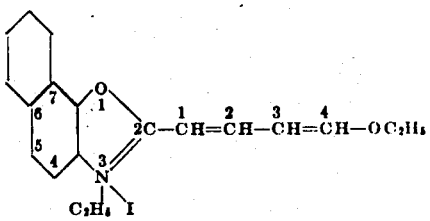

17.0 g. (1 mol.) of 2-methyl-α-naphthoxazole ethiodide and 17.4 g. (1 mol.+100% excess) of β-ethoxyacrolein diethyl acetal were placed in 50 cc. of glacial acetic acid. The mixture was boiled, under reflux, for one minute. The green reaction mixture was cooled, diluted with 300 cc. of diethyl ether and chilled. The ether layer was decanted. The residue was stirred with 50 cc. of hot acetone, until the intermediate became crystalline. The acetone mixture was then chilled and the intermediate filtered off. It was washed with acetone and dried in the air. 9.8 g. (47% yield) of green crystals, melting at 170° to 171° C. with decomposition were thus obtained.

EXAMPLE 5.—2-(4-ethoxy-1,3-butadienyl)-β-naphthoxazole ethiodide 17.0 g. (1 mol.) of 2-methyl-β-naphthoxazole ethiodide and 17.4 g. (1 mol.+100% excess) of β-ethoxyacrolein diethyl acetal were placed in 50 cc. of glacial acetic acid. The mixture was boiled, under reflux, for five minutes. The brown reaction mixture was chilled, diluted with 300 cc. of diethyl ether. The diluted mixture was chilled, and stirred, and the ether layer then decanted. The residue was stirred with 50 cc. of hot acetone, until the intermediate became crystalline. The acetone mixture was then chilled, the intermediate filtered off, washed with acetone and dried in the air. 6.1 g. (29% yield) of brown crystals, melting at 170° to 173° C. with decomposition, were thus obtained.

EXAMPLE 6.—2-(4-ethoxy-1,3-butadienyl)-quinoline ethiodide

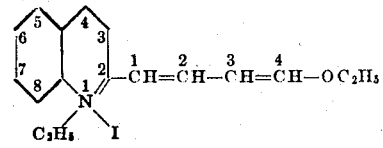

29.9 g. (1 mol.) of quinaldine ethiodide and 34.8 g. (1 mol.+100% excess) of β-ethoxyacrolein diethyl acetal were mixed together in 100 cc. of glacial acetic acid. The mixture was boiled, under reflux, for five minutes. The brown reaction mixture was cooled, diluted with 500 cc. of diethyl ether, and the diluted mixture was allowed to stand for four hours at 0° C. The ether layer was then decanted through a filter, and the residue was stirred with 50 cc. of acetone, until the intermediate became crystalline. The intermediate was then filtered off with suction, washed with acetone and dried in the air. 24.0 g. (63% yield) of greenish brown crystals were thus obtained. A portion of the crystals were recrystallized from methyl alcohol (10 cc. per gram of intermediate) and found to melt at 182° to 184° C. with decomposition.

EXAMPLE 7.—2-(ethoxy-1,3-butadienyl)-benzoselenazole ethiodide 35.2 g. (1 mol.) of 2-methylbenzoselenazole ethiodide and 34.8 g. (1 mol.+100% excess) of β-ethoxyacrolein diethyl acetal were mixed together in 100 cc. of glacial acetic acid. The mixture was heated on a steam bath for three minutes, with stirring. The greenish reaction mixture was chilled, the intermediate filtered off, washed with acetone and water, and finally dried in the air. The intermediate was recrystallized from methyl alcohol (12 cc. per gram of intermediate) and obtained as green crystals melting with decomposition at 176° to 177° C. Yield 19.6 g. (45%).

EXAMPLE 8.—2-(4-ethoxy-1,3-butadienyl)-thiazoline methiodide

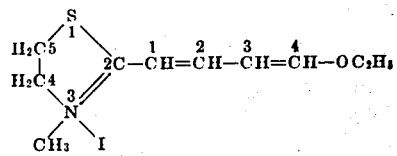

48.6 g. (1 mol.) of 2-methylthiazoline methiodide and 69.6 g. (1 mol.+100% excess) of β-ethoxyacrolein diethyl acetal were mixed together in 100 cc. of glacial acetic acid. The mixture was heated for ten minutes on a steam bath, with stirring. The brownish reaction mixture was cooled, diluted with 300 cc. of diethyl ether, and then chilled to 0° C. The ether layer was decanted and the residue stirred with acetone, until the intermediate was crystalline. The acetone mixture was chilled and the intermediate filtered off. It was washed with acetone and dried in vacuo over anhydrous potassium carbonate. In this manner were obtained 15.9 g. (24% yield) of hygroscopic brown crystals, melting at 124° to 127° C. with decomposition.

In a manner similar to that illustrated in the foregoing examples, 2-(4-ethoxy-1,3-butadienyl)-benzothiazole pheniodide can be prepared from 2-methylbenzothiazole pheniodide, and 2-(4-ethoxy-1,3-butadienyl) - 3,4 - trimethylenebenzothiazolium iodide can be prepared from 2-methyl-3,4-trimethylenebenzothiazolium iodide.

2-Methylbenzothiazole pheniodide and 2-methyl-3,4-trimethylenebenzothiazolium iodide can be prepared as described in the copending application of Leslie G. S. Brooker and Homer W. J. Cressman, Serial No. 353,502, filed August 21, 1940, by oxidizing thioacetyldiphenylamine or 1-thioacetyl-1,2,3,4-tetrahydroquinoline with iodine for example.

As demonstrated in the foregoing examples, the cyclammonium quaternary salts are advantageously employed as the quaternary iodides. However, any quaternary salt form can be employed.

My new intermediates can be condensed with cyclammonium alkyl quaternary salts containing a methyl group in the alpha or gamma position, i. e. in one of the so-called reactive positions, in the presence of a basic condensing agent, to give symmetrical and unsymmetrical dicarbocyanine dyes. I have found that pyridine and trialkylamines dissolved in acetic anhydride are especially suitable basic condensing agents. The following examples illustrate the formation of dicarbocyanine dyes from my new intermediates. These examples are not intended to limit my invention.

EXAMPLE 9.—3,3'-diethylthiadicarbocyanine iodide 1.3 g. (1 mol.) of 2-(4-ethoxy-1,3-butadienyl)-benzothiazole ethiodide and 1.0 g. (1 mol.) of 2-methylbenzothiazole ethiodide were mixed together in 15 cc. of pyridine. The mixture was boiled, under reflux, for five minutes. Green crystals of dye separated from the boiling mixture. The mixture was chilled to 0° C., the dye filtered off, washed with acetone and water, and finally dried in the air. It was recrystallized from methyl alcohol (160 cc. per gram of dye) and obtained as bright green crystals, melting with decomposition at 251° to 253° C. Yield 1.3 g. 75%).

EXAMPLE 10.—1',3-diethyloxa-2'-dicarbocyanine iodide 1.86 g. (1 mol.) of 2-(4-ethoxy-1,3-butadienyl)-benzoxazole ethiodide and 1.5 g. (1 mol.) of quinaldine ethiodide were mixed together in 15 cc. of acetic anhydride containing 0.5 g. (1 mol.) of triethylamine. The mixture was boiled, under reflux, for one minute. The blue solution was cooled, diluted with 100 cc. of diethyl ether, the diluted mixture chilled to 0° C. and the ether layer decanted. The residue was stirred with 10 cc. of methyl alcohol. The methyl alcoholic mixture was chilled, the dye filtered off, washed with methyl alcohol and dried in the air. After recrystallization from methyl alcohol (25 cc. per gram of dye), the dye was obtained as green crystals melting with decomposition at 149° to 150° C. Yield 1.1 g. (44%).

In addition, the following dicarbocyanine dyes were prepared:

| Dye and yield (recrystallized) | Alkoxy intermediate | Cyclammonium salt containing methyl group | Basic condensing agent | Color and melting point, ° C. |
|---|---|---|---|---|
| 1',3-diethylthia-2'-dicarbocyanine iodide (78%). | 2-(4-ethoxy-1,3-butadienyl)-benzothiazole ethiodide. | Quinaldine ethiodide. | Triethylamine and acetic anhydride. | Green crystals (golden reflex) 234–236 d. |
| 1',3-diethylthia-4'-dicarbocyanine iodide (51%). | ...do... | Lepidine ethiodide. | ...do... | Green crystals 175–176 d. |
| 3,3'-diethyl-4,5-benzothiadicarbocyanine iodide (39%). | ...do... | 2-methyl-β-naphthothiazole ethiodide. | Pyridine. | Dark green crystals 189–191 d. |
| 3,3'-diethyl-4,5,4',5'-dibenzothia-dicarbocyanine iodide (32%). | 2-(4-ethoxy-1,3-butadienyl)-β-naphthothiazole ethiodide. | 2-methyl-β-naphthothiazole etho-p-toluene-sulfonate. | ...do... | Green crystals 225–227 d. |
| 1,1'-diethyl-2,2'-dicarbocyanine iodide (55%). | 2-(4-ethoxy-1,3-butadienyl)-quinoline-ethiodide. | Quinaldine ethiodide. | ...do... | Green needles 269–271 d. |
| 3,3'-diethyloxathiadicarbocyanine iodide (58%) | 2-(4-ethoxy-1,3-butadienyl)-benzoxazole ethiodide. | 2-methyl-benzothiazole ethiodide. | ...do... | Green needles 242–244 d. |
| 3,3'-diethyloxa-dicarbocyanine iodide (54%). | ...do... | 2-methyl-benzoxazole ethiodide. | ...do... | Blue crystals (silvery reflex) 229–230 d. |
| 1',3-diethyloxa-4'-dicarbocyanine iodide (24%) | ...do... | Lepidine ethiodide. | Triethylamine and acetic anhydride. | Green crystals (golden reflex) 132–134 d. |

| Dye and yield (recrystallized) | Alkoxy intermediate | Cyclammonium salt containing methyl group | Basic condensing agent | Color and melting point, ° C. |
|---|---|---|---|---|
| 3,3'-diethylselena-dicarbocyanine iodide (69%) | 2-(4-ethoxy-1,3-butadienyl)-benzoselenazole ethiodide. | 2-methyl-benzoselenazole ethiodide. | Pyridine | Green needles 235–236 d. |
| 3,3'-diethylselenathiadicarbocyanine iodide (74%). | do | 2-methyl-benzothiazole ethiodide. | do | Green crystals 236–237 d. |
| 3,3'-diethyloxazelenadicarbocyanine iodide (43%). | do | 2-methyl-benzoxazole ethiodide. | do | Green crystals (bright reflex) 220–222 d. |
| 3-ethyl-3'-methylthiathiazolino-dicarbocyanine iodide (26%). | 2-(4-ethoxy-1,3-butadienyl)-thiazoline methiodide. | 2-methyl-benzo-thiazole ethiodide. | do | Dull blue crystals 163–166 d. |

My new intermediates can be condensed with heterocyclic organic compounds containing a ketomethylene group, in the presence of a basic condensing agent, to give merodicarbocyanine dyes. Thus, 2-(4-ethoxy-1,3-butadienyl)-benzothiazole ethiodide was condensed with 3-ethyl rhodanine, in the presence of triethylamine and acetic anhydride to give 3-ethyl-5-[(3-ethyl-2(3)-benzothiazolylidene) butenylidene]-rhodanine, in the form of blue needles melting at 234° to 236° C. with decomposition, after recrystallization from a mixture of pyridine (10 volumes) and methyl alcohol (15 volumes). The same intermediate was also condensed with 3-methyl-1-phenyl-5-pyrazolone and with 1-ethyl-3-phenyl-2-thiohydantoin.

My new intermediates can be condensed with primary or secondary aliphatic or aromatic amines to give hemidicarbocyanine dyes. The following example illustrates the formation of such dyes:

EXAMPLE 11.—2-(4-piperidino - 1,3 - butadienyl) benzothiazole ethiodide 1.93 g. (1 mol.) of 2-(4-ethoxy-1,3-butadienyl) benzothiazole ethiodide and 1.7 g. (1 mol.+300% excess) of piperidine were mixed together in 25 cc. of absolute ethyl alcohol. The mixture was boiled, under reflux, for ten minutes. The reaction mixture was then chilled, 200 cc. of diethyl ether added, and after again chilling, the ether layer decanted through a filter. The acetone mixture was chilled, the dye filtered off, washed with acetone and water and finally dried. Yield of blue crystals 1.7 g. (81%). After several recrystallizations from absolute ethyl alcohol, the dye was obtained in small yield as pink crystals, melting with decomposition at 266° to 268° C.

The same intermediate was condensed with aniline.

My new intermediates can be condensed with N-alkyl or N-arylpyrroles to give polymethine dyes which are useful as light-screening substances in the preparation of photographic elements. Polymethine dyes obtained in this manner are bleachable by the ordinary alkaline developers. The following examples will serve to demonstrate the manner of obtaining these polymethine dyes.

EXAMPLE 12.—(3 - ethyl - 2 - benzothiazole) (1-heptyl-2,5-dimethyl-3-pyrrole) tetramethine cyanine iodide

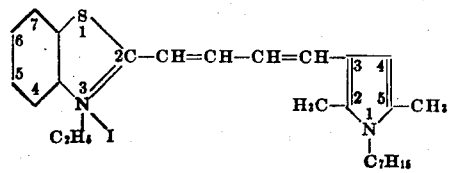

7.7 g. (1 mol.) of 2-(4-ethoxy-1,3-butadienyl)-benzothiazole ethiodide and 7.6 g. (1 mol.+100% excess) of 1-heptyl-2,5-dimethylpyrrole were mixed together in 50 cc. of acetic anhydride. The mixture was boiled, under reflux, for two minutes, with stirring. Green crystals of the dye separated from the boiling reaction mixture. The reaction mixture was chilled to 0° C., the dye filtered off, washed with acetone and dried in the air. After recrystallization from methyl alcohol (22 cc. per gram of dye), the dye was obtained as green crystals, with a bright metallic reflex, and melting with decomposition at 233° to 234° C. with decomposition. The dye gave a red solution in methyl alcohol. Yield 8.0 g. (75%).

In a similar manner, the following tetramethinecyanine iodides were obtained:

| Dye | Intermediate | Pyrrole | Color and melting point, ° C. | Color of methyl alcohol solution |
|---|---|---|---|---|
| (3-ethyl-2-benzoxazole)-(1-heptyl-2,5-dimethyl-3-pyrrole)- | 2-(4-ethoxy-1,3-butadienyl)-benzoxazole ethiodide. | 1-heptyl-2,5-dimethyl-pyrrole. | Red crystals metallic reflex 191–192. | Red. |
| (3-ethyl-2-benzoxazole)-(1-lauryl-2,5-dimethyl-3-pyrrole)- | do | 1-lauryl-2,5-dimethyl pyrrole. | Red crystals 189–190. | Red. |
| (3-ethyl-2-benzoxazole)-(1-ethyl-2,5-dimethyl-3-pyrrole)- | do | 1-ethyl-2,5-dimethyl-pyrrole. | Green crystals 221–222. | Red. |
| (1-cetyl-2,5-dimethyl-3-pyrrole)-(3-ethyl-2-benzoxazole)- | do | 1-cetyl-2,5-dimethyl-pyrrole. | Red crystals 189–193. | Red. |
| (1-ethyl-2,5-dimethyl-3-pyrrole)-(3-ethyl-2-α-naphthoxazole)- | 2-(4-ethoxy-1,3-butadienyl-α-naphthoxazole ethiodide. | 1-ethyl-2,5-dimethyl-pyrrole. | Violet crystals 165–167. | Red. |
| (3-ethyl-2-α-naphthoxazole)-(1-lauryl-2,5-dimethyl-3-pyrrole)- | do | 1-lauryl-2,5-dimethyl-pyrrole. | Green prism green reflex 198–199. | Red. |
| (1-ethyl-2,5-dimethyl-3-pyrrole)-(1-ethyl-2-β-naphthoxazole)- | 2-(4-ethoxy-1,3-butadienyl)-β-naphthoxazole ethiodide. | 1-ethyl-2,5-dimethyl-pyrrole. | Red crystals silvery reflex 231–232. | Red. |
| (1-ethyl-2,5-dimethyl-3-pyrrole)-(1-ethyl-2-quinoline)- | 2-(4-ethoxy-1,3-butadienyl)-quinoline ethiodide. | 1-ethyl-2,5-dimethyl-pyrrole. | Green crystals greenish reflex 238–239. | Red. |

| Dye | Intermediate | Pyrrole | Color and melting point, °C. | Color of methyl alcohol solution |
|---|---|---|---|---|
| (3-ethyl-2-benzothiazole)-(1-ethyl-2,5-dimethyl-3-pyrrole)- | 2-(4-ethoxy-1,3-butadienyl)-benzothiazole ethiodide. | 1-ethyl-2,5-dimethyl-pyrrole. | Green needles bright green reflex 245-247. | Red. |
| (3-ethyl-2-benzothiazole)-(2,5-dimethyl-1-phenyl-3-pyrrole)- | ......do...... | 1-phenyl-2,5-dimethyl-pyrrole. | Green crystals 247-249. | Red. |
| (1-ethyl-2,5-dimethyl-3-pyrrole)-3-methyl-2-thiazoline)- | 2-(4-ethoxy-1,3-butadienyl)-thiazoline methiodide. | 1-ethyl-2,5-dimethyl-pyrrole. | Brown crystals 235-236. | Orange. |
| (3-ethyl-2-benzoselenazole)-(1-ethyl-2,5-dimethyl-3-pyrrole)- | 2-(4-ethoxy-1,3-butadienyl)-benzoselenazole ethiodide. | 1-ethyl-2,5-dimethyl-pyrrole. | Green needles 241-242. | Bluish-red. |

My new intermediates can be represented by the following general formula:

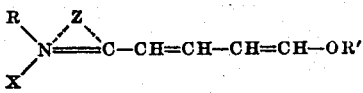

wherein R represents an organic radical selected from the group consisting of alkyl and aryl groups, R' represents an alkyl group, X represents an acid radical, and Z represents the non-metallic atoms necessary to complete a heterocyclic organic nucleus. Intermediates of the above formula wherein Z represents the non-metallic atoms necessary to complete a quinoline, a benzoxazole, a naphthoxazole, a benzothiazole, a naphthothiazole, a benzoselenazole or a thiazoline nucleus, are especially useful in the preparation of dicarbocyanine dyes.

What I claim as my invention and desire to be secured by Letters Patent of the United States is:

1. A polymethine dye intermediate selected from the group having the following general formula:

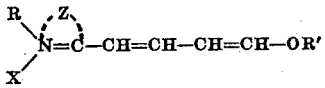

wherein R represents an organic radical selected from the group consisting of alkyl and aryl groups, R' represents an alkyl group, X represents an acid radical, and Z represents the non-metallic atoms necessary to complete a heterocyclic organic nucleus.

2. A polymethine dye intermediate selected from the group having the following general formula:

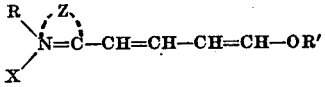

wherein R represents an organic radical selected from the group consisting of alkyl and aryl groups, R' represents an alkyl group, X represents an acid radical, and Z represents the non-metallic atoms necessary to complete a heterocyclic nucleus selected from the group consisting of quinoline, benzoxazole, naphthoxazole, benzothiazole, naphthothiazole, benzoselenazole and thiazoline nuclei.

3. A polymethine dye intermediate selected from the group having the following general formula:

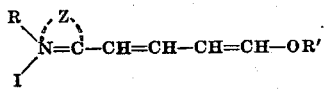

wherein R represents an organic radical selected from the group consisting of alkyl and aryl groups, R' represents an alkyl group and Z represents the non-metallic atoms necessary to complete a heterocyclic organic nucleus.

4. A polymethine dye intermediate selected from the group having the following general formula:

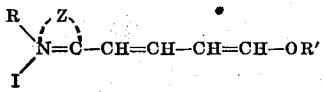

wherein R represents an organic radical selected from the group consisting of alkyl and aryl groups, R' represents an alkyl group, and Z represents the non-metallic atoms necessary to complete a heterocyclic nucleus selected from the group consisting of quinoline, benzoxazole, benzothiazole, benzoselenazole, naphthoxazole, naphthothiazole and thiazoline nuclei.

5. A polymethine dye intermediate selected from the group having the following general formula:

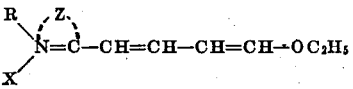

wherein R represents an alkyl group, X represents an acid radical, and Z represents a heterocyclic nucleus selected from the group consisting of quinoline, benzoxazole, benzothiazole, benzoselenazole, naphthoxazole, naphthothiazole and thiazoline nuclei.

6. A polymethine dye intermediate selected from the group having the following general formula:

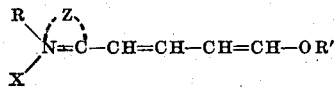

wherein R and R' each represent an alkyl group, X represents an acid radical and Z represents the non-metallic atoms necessary to complete a heterocyclic organic nucleus.

7. A polymethine dye intermediate selected from the group having the following general formula:

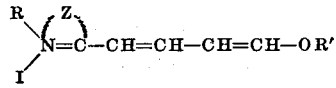

wherein R and R' each represent an alkyl group, and Z represents the non-metallic atoms necessary to complete a heterocyclic organic nucleus.

8. A polymethine dye intermediate selected from the group having the following general formula:

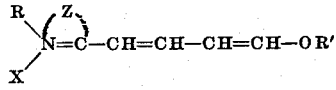

wherein R and R' each represent an alkyl group,

X represents an acid radical, and Z represents the non-metallic atoms necessary to complete a heterocyclic nucleus selected from the group consisting of quinoline, benzoxazole, benzothiazole, benzoselenazole, naphthoxazole, naphthothiazole and thiazoline nuclei.

9. A polymethine dye intermediate selected from the group having the following general formula:

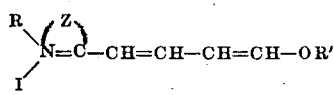

wherein R and R' each represent an alkyl group, and Z represents the non-metallic atoms necessary to complete a heterocyclic nucleus selected from the group consisting of benzoxazole, benzothiazole, benzoselenazole, naphthothiazole, naphthoxazole and thiazoline nuclei.

10. A polymethine dye intermediate selected from the group having the following general formula:

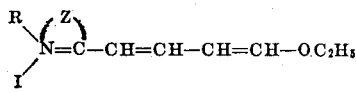

wherein R represents an alkyl group, and Z represents the non-metallic atoms necessary to complete a heterocyclic nucleus selected from the group consisting of quinoline, benzoxazole, benzothiazole, benzoselenazole, naphthothiazole, naphthoxazole and thiazoline nuclei.

11. 2-(4-ethoxy-1,3-butadienyl)-benzoxazole ethiodide.

12. 2-(4-ethoxy-1,3-butadienyl)-benzothiazole ethiodide.

13. 2-(4-ethoxy-1,3-butadienyl)-benzoselenazole eithiodide.

14. In a process for preparing a polymethine dye intermediate comprising condensing, in a reaction medium, a β-alkoxyacrolein acetal with a cyclammonium quaternary salt containing a methyl group in the alpha position, the step which comprises employing, as reaction medium, substantially anhydrous acetic acid.

15. In a process for preparing a polymethine dye intermediate comprising condensing, in a reaction medium β-alkoxyacrolein acetal with a cyclammonium quaternary salt containing a methyl group in the alpha position, the step which comprises employing, as reaction medium, glacial acetic acid.

16. In a process for preparing a polymethine dye intermediate comprising condensing, in a reaction medium, a β-alkoxyacrolein acetal with a cyclammonium quaternary iodide containing a methyl group in the alpha position, the step which comprises employing, as reaction medium, substantially anhydrous acetic acid.

17. In a process for preparing a polymethine dye intermediate comprising condensing, in a reaction medium, β-ethoxyacrolein diethyl acetal with a cyclammonium quaternary salt containing a methyl group in the alpha position, the step which comprises employing as reaction medium, substantially anhydrous acetic acid.

ROBERT H. SPRAGUE.